US 9,030,809 B2

(12) United States Patent
Sabani et al.

(10) Patent No.: US 9,030,809 B2
(45) Date of Patent: May 12, 2015

(54) HOUSING FOR A SWITCHGEAR ASSEMBLY MODULE, SWITCHGEAR ASSEMBLY MODULE AND SWITCHGEAR ASSEMBLY

(75) Inventors: Arben Sabani, Zürich (CH); Diego Sologuren-Sanchez, Wettingen (CH); Roland Würgler, Dietlikon (CH); Tilo Bolli, Merligen (CH)

(73) Assignee: ABB Technology AG, Zurich (CH)

( * ) Notice: Subject to any disclaimer, the term of this patent is extended or adjusted under 35 U.S.C. 154(b) by 220 days.

(21) Appl. No.: 13/552,216

(22) Filed: Jul. 18, 2012

(65) Prior Publication Data
US 2012/0293919 A1   Nov. 22, 2012

Related U.S. Application Data (63) Continuation of application No. PCT/EP2010/050518, filed on Jan. 18, 2010.

(51) Int. Cl.
*H02B 13/00* (2006.01)
*H02B 13/035* (2006.01)
*H02B 13/045* (2006.01)

(52) U.S. Cl.
CPC .......... *H02B 13/0352* (2013.01); *H02B 13/045* (2013.01)

(58) Field of Classification Search
CPC ............................ H02B 1/0352; H02B 13/045
USPC ..................................... 361/612, 618; 218/13
See application file for complete search history.

(56) References Cited

U.S. PATENT DOCUMENTS

| 4,689,717 | A  | * | 8/1987  | Munzinger et al. ........... 361/618 |
| 6,411,514 | B1 | * | 6/2002  | Hussaini ....................... 361/704 |
| 6,509,522 | B1 | * | 1/2003  | Okabe et al. .................... 174/28 |
| D670,657  | S  | * | 11/2012 | Sabani et al. ................ D13/158 |
| 8,552,317 | B2 | * | 10/2013 | Zwicky et al. .............. 200/48 R |

(Continued)

FOREIGN PATENT DOCUMENTS

| DE | 7607568 U1       | 9/1977 |
| DE | 89 07 711 U1     | 8/1989 |
| DE | 10 2006 062540 A1 | 7/2008 |

(Continued)

OTHER PUBLICATIONS

International Search Report (PCT/ISA/210) issued on Jan. 19, 2011, by the European Patent Office as the International Searching Authority for International Application No. PCT/EP2010/050518.

(Continued)

*Primary Examiner* — Zachary M Pape
(74) *Attorney, Agent, or Firm* — Buchanan Ingersoll & Rooney PC (57) ABSTRACT

A housing for a switchgear assembly module of a switchgear assembly forms a common gas space suitable for accommodating an insulating gas and three gas-insulated busbar nominal conductors of the switchgear assembly module. The housing includes three first busbar openings, which are arranged areally in a first opening plane and along a first straight line, three second busbar openings, which are arranged on a side, which is opposite the three first busbar openings, of the housing, and three outgoing conductor openings which are arranged areally in a second opening plane and along a second straight line.

26 Claims, 3 Drawing Sheets (56) References Cited

U.S. PATENT DOCUMENTS

| | | | |
|---|---|---|---|
| 8,629,367 B2 * | 1/2014 | Zwicky et al. | 218/68 |
| 2012/0113568 A1 * | 5/2012 | Sologuren-Sanchez et al. | 361/612 |

FOREIGN PATENT DOCUMENTS

| | | |
|---|---|---|
| EP | 0 204 082 A1 | 12/1986 |
| EP | 0 291 762 A2 | 11/1988 |
| EP | 2 254 135 A1 | 11/2010 |
| WO | WO 2008/022893 A1 | 2/2008 |
| WO | WO 2010/133692 A1 | 11/2010 |

OTHER PUBLICATIONS

Written Opinion (PCT/ISA/237) issued on Jan. 19, 2011, by the European Patent Office as the International Searching Authority for International Application No. PCT/EP2010/050518.

Notification of Transmittal of Translation of the International Preliminary Report on Patentability (Forms PCT/IB/338 and PCT/IB/373) and the Written Opinion of the International Searching Authority (Form PCT/ISA/237) dated Aug. 16, 2012, issued in corresponding International Application No. PCT/EP2010/050518. (8 pages).

\* cited by examiner

HOUSING FOR A SWITCHGEAR ASSEMBLY MODULE, SWITCHGEAR ASSEMBLY MODULE AND SWITCHGEAR ASSEMBLY

RELATED APPLICATION(S)

This application claims priority as a continuation application under 35 U.S.C. §120 to PCT/EP2010/050518 filed as an International Application on Jan. 18, 2010 designating the U.S., the entire content of which is hereby incorporated by reference in its entirety.

FIELD

The present disclosure relates to the field of switchgear assemblies, such as gas-insulated high-voltage switchgear assemblies (also referred to as GIS), and to a housing for a switchgear assembly module of a switchgear assembly. More particularly, the present disclosure relates to a housing with a common gas space for accommodating an insulating gas and three gas-insulated busbar conductor sections. The present disclosure also relates to a switchgear assembly module and a switchpanel with such a housing and a substation.

BACKGROUND INFORMATION

In gas-insulated high-voltage assemblies, a modular design of the functional groups such as circuit breakers, grounding switches etc. of a switchpanel is known. In this case, a switchpanel is generally understood to mean a panel of a switchgear assembly and can also be referred to as an outgoing panel, for example. In GIS switchgear assemblies found on the market, GIS with switchpanels having single-phase-encapsulated guidance of the primary conductors will differ fundamentally from GIS with switchpanels having a three-phase-encapsulated guidance of the primary conductors. Single-phase encapsulation is understood to mean encapsulation which provides a dedicated gas space for each of the primary conductors, while three-phase encapsulation is understood to mean the arrangement of three primary conductors in a common gas space. Primary conductors are understood to mean conductors which have a rated load in the high-voltage range.

The type of encapsulation (single-phase or three-phase) is primarily dictated by the desired rated voltage: single-phase-encapsulated switchpanels (panels) enable a much higher rated voltage with comparable complexity. Furthermore, the type of encapsulation has fundamental effects on the layout of the panels and on the configuration and arrangement of the modular functional groups. An example of a housing for a three-phase-encapsulated guidance of the primary conductors is described in WO 2008/022893 A1, for example.

A further housing for a high-voltage switchgear assembly is known from DE 7607568 U. However, this housing could still be improved, in particular with respect to its space requirement and versatility in a modular system.

In order to implement a gas-insulated substation, at least two panels are generally connected to a so-called busbar on the input or output side. In this case, the term busbar includes primary conductor bars which are guided both with single-phase and with three-phase encapsulation. Thus, GIS with single-phase-encapsulated busbar guidance will fundamentally differ from GIS with three-phase-encapsulated busbar guidance with respect to the busbar as well.

Since GIS switchgear assemblies are often also used in built-up areas or other spatially restricted areas, the compactness of a substation is also very important, in addition to the performance. In order to meet both of these demands, attempts are made to increase the power density (per physical volume) of a GIS switchpanel. The maintenance friendliness of a GIS switchgear assembly is also important.

Against this background, the present disclosure provides a housing for a switchgear assembly module, and a switchpanel. Further advantages, features, aspects and details of the disclosure and exemplary embodiments and particular aspects of the disclosure are explained in more detail below with reference to the drawings.

SUMMARY

A housing is disclosed for a switchgear assembly module of a switchgear assembly, wherein the housing forms a common gas space suitable for accommodating an insulating gas and three gas-insulated busbar nominal conductors of the switchgear assembly module and includes: three first busbar openings, wherein the three first busbar openings are arranged areally in a first opening plane and along a first straight line; three second busbar openings, wherein the three second busbar openings are arranged on a side of the housing which is opposite the three first busbar openings; and three outgoing conductor openings, wherein the three outgoing conductor openings are arranged areally in a second opening plane and along a second straight line, wherein an outgoing normal plane, which is perpendicular to the second opening plane and contains the second straight line, is arranged between an outer one of the first busbar openings and a central one of the first busbar openings, and wherein a housing outer surface is designed to be at least partially restricted with respect to a convex envelope.

BRIEF DESCRIPTION OF THE DRAWINGS

In the following description, the disclosure will be explained with reference to exemplary embodiments illustrated in the drawings and providing further advantageous aspects and modifications. In the drawings.

DETAILED DESCRIPTION

Exemplary embodiments of the present disclosure provide a housing for a switchgear assembly module of a switchgear assembly. The housing forms a common gas space, which is suitable for accommodating an insulating gas and three gas-insulated busbar conductor sections of the switchgear assembly module. The housing includes: three first busbar openings, wherein the three first busbar openings are arranged areally in a first opening plane and along a first straight line; three second busbar openings, wherein the three second busbar openings are arranged on a side of the housing which is opposite the three first busbar openings; and three outgoing conductor openings, wherein the three outgoing conductor openings are arranged areally in a second opening plane and along a second straight line.

Exemplary embodiments of the present disclosure also provide a housing for a switchgear assembly module of a switchgear assembly. The housing forms a common gas space, which is suitable for accommodating an insulating gas and three gas-insulated busbar conductor sections of the switchgear assembly module. The housing includes three first busbar openings and three outgoing conductor openings. The housing has an aperture, which passes through the common gas space. The internal volume defined by the common gas space is therefore continuous, but not singly continuous.

Exemplary embodiments of the present disclosure provide a switchgear assembly module, which includes a housing in accordance with exemplary embodiments of the present disclosure. The switchgear assembly module also includes three busbar nominal conductors (also referred to as busbar conductor sections), which each extend from a respective one of the first busbar connection openings to a respective one of the second busbar connection openings, and three outgoing nominal conductors, which each extend from the interior of the housing to a respective one of the second outgoing connection openings. An exemplary embodiment of the present disclosure also provides a switchpanel and a substation (switchgear assembly) with such a housing or with such a switchgear assembly module.

An advantage of at least some embodiments of the present disclosure is that the power density (per physical volume) of a GIS switchpanel and/or a substation can be increased. This advantage is achieved because the common gas space makes a compact, modular design of a busbar module possible, wherein the separate openings (busbar openings and by the outgoing conductor openings) at the same time enable a use in an otherwise at least partially single-phase-encapsulated switchpanel, which allows high voltages of high magnitude. The advantages of a single-phase-encapsulated primary conductor guidance, for example, in the region of the busbar, are therefore combined with advantages of a three-phase-encapsulated modular design. Therefore, owing to the common gas space, simplified monitoring of the gas pressure and overall a reduction in the housing material and the gas volume required are made possible, for example. It is also only necessary for insulating gas to be introduced once, for the gas to be monitored once and for only a single excess pressure protection mechanism to be provided. Furthermore, a common housing for three phases also weighs less and is generally more cost-effective than three separate housings. In addition, a housing not only with small outer dimensions, but also with a small internal volume is now possible owing to the arrangement of the openings, with the result that the protective gas fill volume can also be reduced. A further contribution to the potentially space-saving design is provided by virtue of the fact that the primary connections can be arranged close to one another.

In addition, the arrangement of the openings along respective straight lines and the mutual orientation of these straight lines enables a space-saving design. Furthermore, conductors emerging from the outgoing conductor openings can be passed on in the direction of the first straight line without crossing one another since the second straight line is inclined with respect to the first straight line.

Further advantages are achieved by the modularity of the housing. For example, in the case of an arrangement of the openings at a unit distance, the housing can be used as part of an integral, modular system. For example, in the context of a module system, one advantage includes the versatility in use of the housing or of a switchgear assembly module including the housing. The presence of mutually opposite first and second busbar openings enables, for example, versatility in use of the housing in various orientations and makes it possible for a plurality of modules to be connected in series along a continuous busbar. Particular advantages result if the housing has symmetry properties since it can then be used for a further purpose, for example when rotated through 180°, under certain circumstances with a further orientation of the openings. This simultaneously means increased degree of freedom for the design/construction of the panel without the number of modules to be provided needing to be increased. Modularity is understood to mean the versatility in use of the housing. Thus, the housing can be used both in configurations with a double busbar and in those with a single busbar and/or in the form of a bridge module. Owing to the fact that the housing enables a plurality of functions of the module, a reduction in costs is possible.

For instance, owing to the areal arrangement of the openings in respective opening planes, a simplified installation and dismantling of the module with the housing according to the disclosure is also possible. For example, the housing can be installed into and removed from a switchpanel both in the direction of the first straight line and in the direction of the second straight line. It is even possible for the entire switchpanel to be installed and removed in one of these directions. This enables, for example, rapid removal and replacement of the switchgear assembly module during repair work or maintenance. Owing to these advantages, improved repair and maintenance concepts can be realized.

In embodiments (i.e. in accordance with an exemplary, but non-essential aspect of the disclosure, which can also be expressed by the term "in particular" or "for example"), the second straight line runs in inclined fashion with respect to the first straight line (e.g., not parallel to the first straight line; the straight lines can intersect one another or be skewed with respect to one another). In embodiments, the second straight line runs perpendicular to the first straight line. As an alternative to this, embodiments are also possible in which the second straight line runs parallel to the first straight line. In further embodiments, the second opening plane runs at right angles to the first opening plane. This perpendicular arrangement of the second straight line or opening plane with respect to the first straight line or opening plane results in advantages including the versatility in use of the busbar housing in a GIS.

In accordance with an exemplary embodiment, an orthogonal x-y-z reference system is defined by virtue of the fact that the first straight line defines the z direction. In accordance with an exemplary embodiment, the second straight line defines a y direction, which is perpendicular to the z direction, and therefore also an x direction, which is perpendicular to the z and y directions.

In accordance with an exemplary embodiment, the first straight line, the second straight line, the first opening plane or the second opening plane run in accordance with at least one of the following arrangements: (a) the second opening plane is arranged transversely, in embodiments perpendicular, to the first opening plane; (b) the second straight line is offset with respect to the first straight line in such a way that the first and second straight lines do not intersect one another; (c) the second straight line runs in inclined fashion, in embodiments perpendicular, to the first opening plane; and/or (d) the first straight line runs parallel to the second opening plane. In accordance with one aspect, the third straight line is parallel to the z direction. In accordance with an exemplary embodiment, the first opening plane is parallel to the z and y direction. In accordance with an exemplary embodiment, the second opening plane is parallel to the x and y direction.

In accordance with an exemplary embodiment, the internal volume of the housing forms a continuous gas space, wherein the three first busbar openings, the three second busbar openings and the three outgoing conductor openings each provide or form a separate access point or entrance to the gas space from outside the housing. The gas space is therefore connected to the three first and second busbar openings and to the three outgoing conductor openings. In accordance with an exemplary embodiment, the three second busbar openings are arranged areally in a third opening plane and along a third straight line, wherein the third opening plane is parallel to the first opening plane and the third straight line is parallel to the first straight line. For example, each of the three second busbar openings can be arranged in pairs with respect to a respective one of the three first busbar openings and can form therewith a respective busbar opening pair for accommodating a respective continuous, straight busbar conductor section therebetween, wherein the straight busbar conductor section extends, for example, perpendicular to the first and third opening plane. In accordance with an exemplary embodiment, each of the three first busbar openings with the respective one of the three second busbar openings delimits a cylindrical gas space section of the gas space at the ends, which gas space section extends between the busbar openings. In accordance with an exemplary embodiment, the cylindrical gas space sections each extend along a straight longitudinal axis. The cross section of the gas space sections can be circular, oval or of different shapes, for example.

In accordance with an exemplary embodiment, a housing outer surface is designed to be at least partially constricted with respect to a convex envelope. The envelope describes the global shape of the housing outer surface without taking into consideration local elements such as screws, handles, etc. which are irrelevant for this shape. The envelope is understood to be the shape which is produced when a tensioned film is wound around the housing, wherein the film defining the envelope would rest in each case only on the projections, for example, the contour of the flange-like adapter sections and the like. The housing outer surface therefore has concave depressions with respect to the envelope. These depressions can be provided in a transition region between the first or second busbar openings and the outgoing conductor openings and/or in a transition region between the first busbar openings and the second busbar openings.

In accordance with an exemplary embodiment, the first busbar connection group for each of the three first busbar openings includes in each case one protruding tube stump, which opens out into the respective one of the first busbar openings. In accordance with an exemplary embodiment, the second busbar connection group for each of the three second busbar openings includes in each case one protruding tube stump, which opens out into the respective one of the second busbar openings. In accordance with an exemplary embodiment, the first busbar openings and/or the second busbar openings and/or the outgoing openings are arranged on an end face of the respective tube stump. Depending on the requirements and the embodiments, the tube stumps are spaced apart from one another, for example, are not fused with one another, or are fused with one another.

In accordance with an exemplary embodiment, the first busbar connection group for each of the three first busbar openings includes in each case one flange which surrounds the respective opening circumferentially, wherein the flange is optionally accessible from a region behind the opening and outside the housing. The flanges of the first busbar openings and/or the second busbar openings and/or the outgoing openings are, depending on the embodiment, fully or partially integrated in a common wall section of a main chamber of the housing or are spaced apart from a wall section of the main chamber by tube stumps and are in the form of independent flanges. Depending on the embodiment, all of the flanges of the first busbar openings and/or the second busbar openings and/or the outgoing openings are configured separately and spaced apart from one another, or at least two of the flanges are connected to one another to form a flange group. For example, all of the flanges of the first busbar openings and/or the second busbar openings and/or the outgoing openings can be connected to one another to form a respective first busbar flange group and/or second busbar flange group and/or outgoing flange group.

In accordance with one aspect, the first or second busbar openings are each directed towards the y direction, for example, their normal extends in the y direction. Thus, the mutually parallel normals of the openings span a busbar plane (y-z plane), with the result that nominal conductors which leave the openings centrally and perpendicular lie in the y-z plane. The busbar openings are surrounded by flanges. The flanges lie in a common plane, an x-z plane. Each of the three busbar openings has a dedicated, separate flange. The flange is, for example, provided with a fastening device for a post insulator. The fastening device includes, for example, apertures formed in the flange for fastening screws.

In accordance with an exemplary embodiment, the hosing includes three outgoing conductor housing sections, wherein the three outgoing conductor openings are arranged on a respective one of the three outgoing conductor housing sections. In accordance with an exemplary embodiment, at least one of the three outgoing conductor housing sections connects the internal volumes of in each case at least two of the three busbar housing sections of the gas space fluidically to one another. In accordance with an exemplary embodiment, each of the three outgoing conductor housing sections connects the internal volumes of in each case at least two of the busbar housing sections to one another. In accordance with an exemplary embodiment, at least one of the three outgoing conductor housing sections connects the internal volumes of the three busbar housing sections to one another. In accordance with an exemplary embodiment, each of the three outgoing conductor housing sections connects the internal volumes of the three busbar housing sections to one another. In accordance with an exemplary embodiment, a first outgoing conductor housing section of the three outgoing conductor housing sections connects the three busbar housing sections directly and fluidically to one another, a second outgoing conductor housing section connects only two of the three busbar housing sections directly and fluidically to one another, and a third outgoing conductor housing section is connected directly and fluidically only to a single one of the three busbar housing sections, or else the third outgoing conductor housing section connects the three busbar housing sections directly and fluidically to one another. In accordance with an exemplary embodiment, the first outgoing conductor housing section is arranged next to the first busbar openings, the second outgoing conductor housing section is arranged centrally, and the third outgoing conductor housing section is arranged next to the second busbar openings. In accordance with an exemplary embodiment, one of the three outgoing conductor housing sections, which is next to the first busbar openings, connects the three busbar housing sections fluidically to one another and/or a centrally arranged one of the three outgoing conductor housing sections connects only two of the three busbar housing sections fluidically to one another and/or one of the three outgoing conductor housing sections which is next to the second busbar openings is connected fluidically directly only to a single one of the three busbar housing sections.

In accordance with an exemplary embodiment, the outgoing conductor housing sections are in the form of cylinder sections and have a cylindrical internal volume. The outgoing conductor housing sections are spaced apart from one another. The distance between their cylinder axes or centers is greater than the cylinder outer diameter or than twice the radius of curvature of their wall sections. In accordance with an exemplary embodiment, the outgoing conductor housing sections are arranged at a uniform distance from one another along the second straight line. In accordance with an exemplary embodiment, the cylinder axes of the outgoing conductor housing sections extend in the x direction. In accordance with an exemplary embodiment, respective, closed termination pieces are fitted on a respective end side of the outgoing conductor housing sections.

In accordance with an exemplary embodiment, the outgoing conductor connection group for each of the three outgoing conductor openings includes in each case one flange, which surrounds the respective outgoing conductor opening circumferentially, wherein the flange is optionally accessible from a region behind the outgoing conductor opening and outside the housing. In accordance with an exemplary embodiment, the outgoing conductor openings are each directed towards a direction which is perpendicular to the first and second straight lines or are directed towards a direction which is perpendicular to the second opening plane. In accordance with an exemplary embodiment, the normal of the outgoing conductor openings extends in the x direction. Therefore, the outgoing conductor openings span an outgoing normal plane (a plane spanned by the second straight line and the mutually parallel normals of the openings), with the result that nominal conductors which leave the outgoing conductor openings centrally and perpendicular lie in the outgoing normal plane. The outgoing normal plane can be an x-y plane.

In accordance with an exemplary embodiment, the outgoing normal plane intersects a busbar normal plane, which is formed correspondingly by the busbar openings, in a line of intersection which is offset with respect to each of the mid-axes of the busbar openings in the z direction. For example, the line of intersection is arranged outside the busbar openings, such as between two of the busbar openings.

In accordance with an exemplary embodiment, the outgoing conductor openings are surrounded by flanges. The flanges lie in a common plane, for example a y-z plane. Each of the three outgoing conductor openings has a dedicated separate flange. The flange is, for example, provided with a fastening device for a barrier insulator. The fastening device includes, for example, apertures formed in the flange for fastening screws.

In accordance with an exemplary embodiment, the housing has at least one aperture, which passes through a continuous internal volume defined by the housing. In accordance with an exemplary embodiment, the aperture also passes through the outer envelope of the housing. In accordance with an exemplary embodiment, the aperture is arranged between two, for example, an outer one and a central one of the busbar housing sections. In accordance with an exemplary embodiment, the aperture is arranged between two, for example, the two outer ones, of the outgoing conductor housing sections.

In accordance with an exemplary embodiment, the housing has a large number of apertures, for example, two or three apertures.

In accordance with an exemplary embodiment, the housing includes a cooling device for increasing the heat dissipation from the internal volume of the housing. In accordance with an exemplary embodiment, the cooling device is arranged on a termination piece of the outgoing conductor housing section, for example, on an upper termination piece. In accordance with an exemplary embodiment, the housing includes at least one, for example, cylindrical actuating shaft housing section for accommodating an actuating shaft. The actuating shaft is designed for actuating switching elements which are or can be arranged in the internal volume of the housing. In accordance with an exemplary embodiment, the actuating shaft housing section extends along the three outgoing conductor housing sections and provides an internal volume, which is connected directly to the interior of the outgoing conductor housing sections, for an actuating shaft extending along a straight line. The actuating shaft housing section can extend along the three outgoing conductor housing sections and provide an internal volume, which is connected directly to the interior of the outgoing conductor housing sections, for a straight actuating shaft. In accordance with an exemplary embodiment, a cylinder axis of the actuating shaft housing section extends in the y direction or parallel to the second straight line. In accordance with an exemplary embodiment, the actuating shaft housing section is arranged so as to be offset in the x direction with respect to the cylinder axes of the busbar housing sections. The offset is, for example, half the distance between the cylinder axes of the busbar housing sections.

In accordance with an exemplary embodiment, the housing has symmetry properties. In accordance with this exemplary embodiment, the set of openings, including the first busbar openings, the second busbar openings and the outgoing openings, are arranged in mirror-symmetrical fashion with respect to a mirror plane and, in accordance with an exemplary embodiment, the mirror plane is arranged parallel to the first opening plane. In accordance with an exemplary embodiment, the housing is designed to be substantially mirror-symmetrical with respect to the mirror plane. Substantially mirror-symmetrical means a symmetry with respect to the busbar and outgoing openings and with respect to the main geometry of the housing, but not with respect to any auxiliary connections and other non-essential details. Expressed quantitatively, the volume of the gas space which is not overlapping during mirroring is no more than 5% of the total volume of the gas space. In one embodiment of the housing, the mirror plane runs through a central outgoing conductor opening, which is arranged between the two remaining outgoing conductor openings.

In accordance with an exemplary embodiment, the housing is designed for a switching module of a high-voltage switchgear assembly, for example, for voltages of at least 50 kV.

An exemplary embodiment of the present disclosure provides a switchgear assembly module including any housing described herein. The switchgear assembly module furthermore includes a busbar conductor section including three busbar phase conductors, which extend in each case from a respective one of the first busbar connection openings to a respective one of the second busbar connection openings; and an outgoing conductor section including three outgoing phase conductors, which each extend towards a respective one of the second outgoing connection openings. In accordance with an exemplary embodiment, the switchgear assembly module furthermore includes a switch disconnector system with three switch disconnectors, wherein each of the three switch disconnectors switches an electrical contact between a respective one of the busbar phase conductors and a respective one of the outgoing phase conductors. In accordance with an exemplary embodiment, the switch disconnector system includes an actuation system for jointly actuating the three switch disconnectors. In accordance with an exemplary embodiment, the actuation system includes an actuating shaft. In embodiments, the actuating shaft extends along the actuating shaft housing section. In accordance with an exemplary embodiment, the busbar phase conductors extend in a busbar plane (y-z plane or the plane which contains the first straight line and is perpendicular to the first opening plane), at least in the region of the first and second busbar openings. In accordance with an exemplary embodiment, the outgoing phase conductors extend in an outgoing normal plane (x-y plane or the plane which contains the second straight line and is perpendicular to the second opening plane), at least in the region of the outgoing conductor openings.

An exemplary embodiment of the present disclosure provides a switchpanel including any switchgear assembly module described herein. In accordance with one aspect, the switchpanel further includes: a busbar conductor section including three busbar phase conductors, which each extend from a respective one of the first busbar connection openings to a respective one of the second busbar connection openings; and an outgoing conductor section including three outgoing phase conductors, which each extend towards a respective one of the second outgoing connection openings. In accordance with one aspect, the switchpanel further includes: a switch disconnector system with three switch disconnectors which can be opened, wherein each of the three switch disconnectors produces an electrical contact between a respective one of the busbar phase conductors and a respective one of the outgoing phase conductors.

An exemplary embodiment of the present disclosure provides a switchgear assembly (substation) including any switchgear assembly module described herein. The switchgear assembly further includes at least one busbar, wherein the busbar conductor section forms a longitudinal section of the busbar. In accordance with an exemplary embodiment, at least sections of the busbar are single-phase-encapsulated. In accordance with an exemplary embodiment, at least sections of the outgoing nominal conductors are single-phase-encapsulated. In accordance with an exemplary embodiment, the busbar conductors each extend in the y direction, with the result that the busbar spans a y-z plane. In accordance with an exemplary embodiment, the outgoing nominal conductors extend in an x direction, which is perpendicular to the y and z direction, with the result that the outgoing conductors span an x-y plane. An exemplary embodiment of the present disclosure provides a switchgear assembly which includes a switchgear assembly module in accordance with any one of the embodiments and aspects described herein and at least one (gas-insulated, encapsulated) busbar, wherein the busbar includes the busbar conductor section or the busbar conductor sections with the associated busbar housing section form a longitudinal section of the busbar. In accordance with an exemplary embodiment, the busbar extends over at least two (depending on the embodiment adjacent) switchgear assembly modules in accordance with any of the embodiments described herein.

The statement that the housing includes three outgoing conductor openings does not rule out the fact that it also includes further outgoing conductor openings, for example in total four or six outgoing conductor openings. If not mentioned expressly otherwise, an indicated number therefore means a minimum number. In accordance with a particular subaspect, however, precisely this number is meant. In accordance with this subaspect, for example, "three outgoing conductor openings" then means "precisely three outgoing conductor openings". The same applies in relation to the number of outgoing conductors and first and second busbar openings and conductors.

Individual embodiments will now be described with reference to the drawings in general terms and in a manner which is not restricted to the present embodiment. The clarity of the drawings is achieved by virtue of the fact that, according to the situation, no hatching of the interfaces has been provided in the sectional illustrations for reasons of simplicity. For improved understanding of the description, the terms "upper", "lower", "left-hand", "right-hand", "front", "horizontal", "vertical" and variations thereof are merely in relation to the alignments of the objects illustrated in the drawings.

FIGS. 1a to 4b show various views of a switchgear assembly module housing 1 in accordance with a representative embodiment of the disclosure. The housing 1 will be described below with reference to these drawings jointly using the orthogonal x-y-z coordinate system likewise illustrated in the drawings.

Figure 1A:
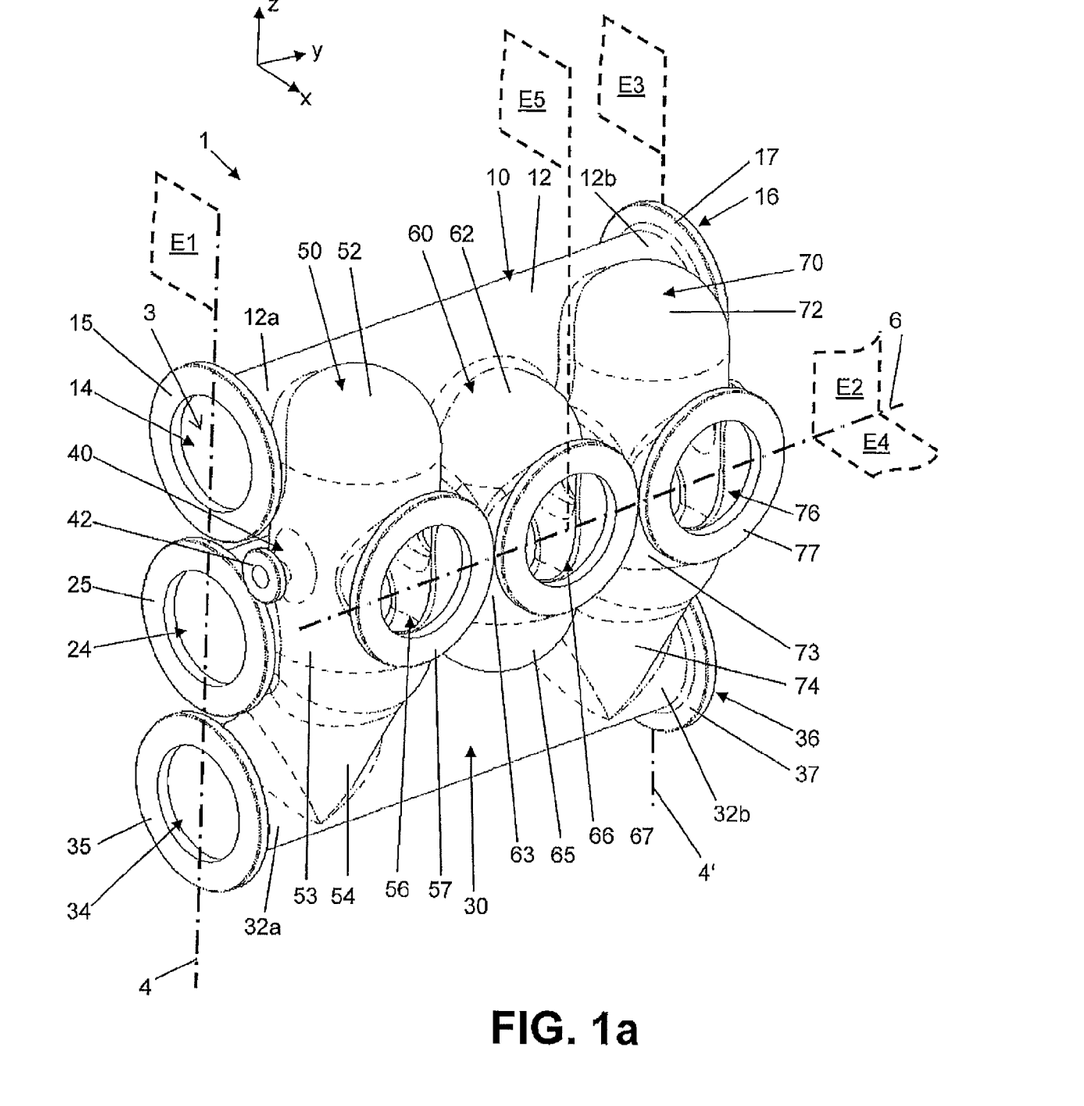
FIGS. 1a and 1b each show a perspective view of a switchgear assembly module housing in accordance with an exemplary embodiment of the present disclosure.
Figure 1B:
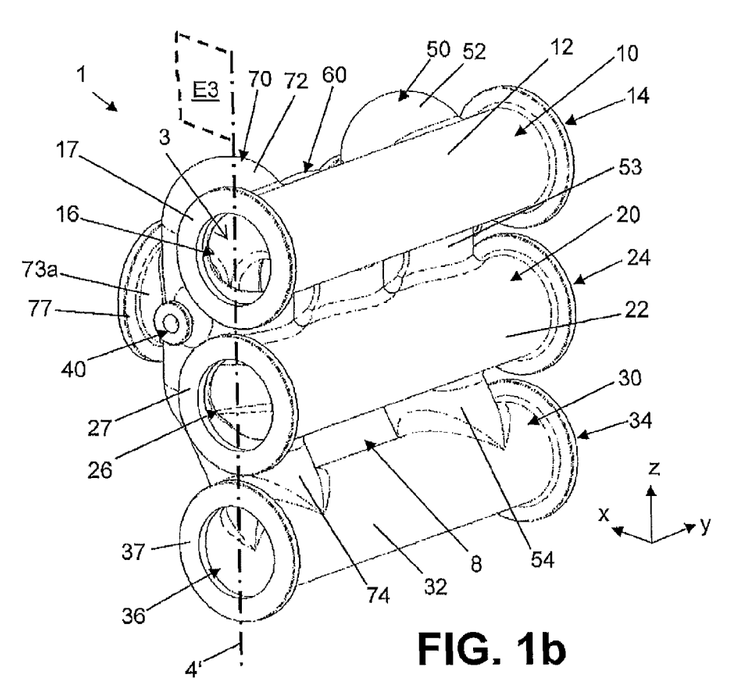

The switchgear assembly module housing 1 has three busbar housing sections 10, 20, 30. The upper busbar housing section 10 extends longitudinally in the y direction from an upper, first busbar opening 14 to an upper, second busbar opening 16. The upper busbar housing section 10 has a central, tubular housing section 12 and two tube stumps 12a and 12b arranged at the ends, an upper, first busbar opening 14, an upper, second busbar opening 16, a flange 15 surrounding the upper, first busbar opening 14, and a flange 17 surrounding the upper, second busbar opening 16.

The central and the lower busbar housing sections 20 and 30, respectively, also extend in the y direction between corresponding central and lower, respectively, first and second busbar openings 24 and 26 and, respectively, 34 and 36, and each have cylindrical housing sections (for example housing section 32), tube stumps 22a and 22b and, respectively, 32a and 32b and flanges 25 and 27 and, respectively, 35 and 37, which surround the respective busbar openings 24 and 26 and 34 and 36, respectively. The description of the upper busbar housing section 10 and its components applies to the busbar housing sections 20 and 30 correspondingly. The cylinder axes of the housing sections 11, 21 and 31 extend parallel to one another in the y direction. The cylinder axes are arranged one above the other in the z direction, with the result that they lie jointly in a y-z plane.

The respective busbar openings 14, 16 and 24, 26 and 34, 36 are arranged concentrically with respect to the respective cylinder axis on mutually opposite end faces of the respective housing sections 11, 21, 31. The busbar openings 14, 24 and 34 arranged on one side of the housing (also referred to as the first busbar openings) form a first busbar connection group. Correspondingly, the busbar openings 16, 26 and 36 arranged on the opposite side of the housing (also referred to as second busbar openings) form a second busbar connection group.

Furthermore, the switchgear assembly module housing 1 has a cylindrical actuating shaft housing section 40. The actuating shaft housing section 40 is configured concentrically with respect to a cylinder axis or actuation axis 144 (see FIG. 4b), which runs parallel to the second straight line 6. The actuating shaft housing section 40 furthermore has a protruding actuating shaft end piece 42 in order to enable the actuation of switching elements arranged in the gas space 3 during operation of the housing 1. The actuating shaft end piece 42 is fitted concentrically with respect to the cylinder axis or actuation axis 144 of the actuating shaft housing section 40 on the end face thereof. As can be seen from FIG. 1b, a corresponding actuating shaft end piece is also illustrated on the opposite end face. Both actuating shaft end pieces are closed. In other embodiments, at least one of these actuating shaft end pieces has an actuating shaft opening, through which the actuating shaft is passed out of the housing or a driveshaft for the actuating shaft is inserted into the housing. Fastening means for fastening an actuating device for driving the actuating shaft are fitted on the actuating shaft end piece 42.

The switchgear assembly module housing 1 furthermore has an outgoing conductor connection group. The outgoing conductor connection group has a first conductor outgoing housing section 50 with a cylindrical housing section 53, which extends in the z direction and is limited at the top by an upper end piece 52 and at the bottom by a transition piece 54. A cylindrical tube stump 53a extends laterally in the x direction (direction of the cylinder axis of the tube stump) away from the cylindrical housing section 53. A tube stump is understood to mean a tubular end piece, with tubular meaning that the piece has a hollow profile. The tube stump 53a opens out at an outgoing conductor opening 56. The outgoing conductor opening 56 has a flange 57 surrounding it.

Correspondingly, the outgoing conductor connection group also has a second and third conductor outgoing housing section 60, 70, which each have a cylindrical housing section 63 and 73 and a respective upper end piece 62 and 72. The respective tube stumps 63a and 73a extend laterally in the x direction away from the respective cylindrical housing sections 63 and 73 and open out at respective outgoing conductor openings 66 and 76. The outgoing conductor openings 66 and 76 are surrounded by respective flanges 67 and 77. While the third conductor outgoing housing section 70 likewise has a transition piece 74 corresponding to the first transition piece 54, the second conductor outgoing housing section 60 does not have such a transition piece. Instead, the second conductor outgoing housing section 60 is limited at the bottom by a lower end piece 65.

The text which follows describes the arrangement and some properties of the various parts of the switchgear assembly module shown in FIGS. 1a and 1b. Individual embodiments of this description represent general aspects of the present disclosure, in accordance with which further embodiments can also be configured independently of the details of the switchgear assembly module shown in FIGS. 1a and 1b. First, the arrangement and some properties of the busbar housing sections 10, 20, 30 and parts thereof will be described.

The busbar openings 14, 24 and 34 (also referred to as first busbar openings) are arranged areally in a first opening plane E1. This means that the respective opening areas defined by the rims of the three first busbar openings 14, 24 and 34 each lie areally in the first opening plane E1. This opening plane E1 is an x-z plane, for example, a plane extending in the x and z directions. The busbar openings 14, 24 and 34 are furthermore arranged along a first straight line 4, for example, respective centers 14a, 24a, 34a of the openings 14, 24, 34 (or their opening areas) lie on this first straight line 4, as can be seen particularly well from FIG. 2b, for example.

The three second busbar openings 16, 26 and 36 are arranged on a side of the housing which is directly opposite the three first busbar openings 14, 24, 34. The second busbar openings 16, 26 and 36 are arranged areally in a further plane E3. The plane E3, also referred to as the third opening plane, is likewise an x-z plane and is therefore parallel to the first opening plane E1. The second busbar openings 16, 26 and 36 are also arranged along a third straight line 4', which runs parallel to the first straight line 4.

The first busbar openings 14, 24, 34 are each directed towards the y direction, for example, their normal (normal with respect to the opening plane) extends in the y direction. The first busbar openings 14, 24, 34 define a first busbar normal plane (y-z plane), which is spanned by the first straight line 4 and the mutually parallel normals of the openings 14, 24, 34, with the result that these normals all lie in the busbar normal plane. In other words, the first busbar openings 14, 24, 34 are arranged in such a way that busbar conductors which leave the openings centrally and perpendicular (for example, parallel to the normal) lie in this busbar normal plane. The second busbar normal plane defined in a corresponding manner by the second busbar openings 16, 26, 36 is identical to the busbar normal plane defined by the first busbar openings 14, 24, 34, namely the y-z plane, which contains the straight lines 4 and 4'. Thus, busbar conductors lying in this busbar normal plane can pass in a straight line through the housing 1.

Each of the three second busbar openings 16, 26, 36 is arranged in pairs with respect to a respective one of the three first busbar openings 14, 24, 34. As a result, three busbar opening pairs (14, 16), (24, 26) and (34, 36) are formed, between which in each case one of the busbar housing sections 10, 20 and 30 is positioned, respectively. This arrangement makes it possible to accommodate a respective, continuous, straight busbar conductor section between the busbar openings in the respective pair. The busbar conductor section extends in the y direction, for example, perpendicular to the first and to the third opening planes E1 and E3.

The busbar housing sections 10, 20, 30 define respective cylindrical internal volumes or gas space sections. The internal volumes are part of the common gas space and are fluidically (hydraulically) connected to these further parts and to one another. Since the housing serves to accommodate an insulating gas, "fluid" will also be understood below to mean a gas. The respective cylinder axes of this internal volume extend in the y direction. The respective cylinder axes are, for example, defined by the tubular longitudinal sections 12, 22, 32 and the tube stumps 12a, 12b, 22a, 22b and 32a, 32b which are arranged concentrically with respect to the respective cylinder axes. Each of the three busbar opening pairs (14, 16), (24, 26) and (34, 36) therefore limits a cylindrical gas space section of the gas space at the ends, which gas space section extends between the busbar opening pairs. The cylindrical gas space sections (at least sections of which have a substantially circular cross section) extend in each case along the respective cylinder axis. In alternative exemplary embodiments, the cross section of the gas space sections can also be oval or nonuniform. In this case, the busbar housing sections 10, 20, 30 and the gas space sections thereof have a straight longitudinal axis instead of a cylinder axis.

The busbar housing sections 10, 20 and 30 are arranged so as to be spaced apart from one another. This means that the distance between the cylinder axes is greater than the cylinder diameter or than double the radius of curvature of the busbar housing sections 10, 20 and 30, respectively. The cylinder diameter or radius of curvature is predetermined by the housing outer side. The three busbar housing sections 10, 20, 30 are arranged in a row at a uniform distance from one another along the first straight line 4 in the z direction.

The three first busbar openings 14, 24, 34 serve to separately accommodate a respective one of three gas-insulated busbar conductor sections of the switchgear assembly. Likewise, the three second busbar openings 16, 26, 36 serve to separately accommodate a respective one of the three busbar conductor sections. The busbar openings could therefore also be referred to as busbar conductor openings. Separately accommodate is in this case understood to mean that the busbar conductors are each arranged in single-phase fashion in the respective openings, for example, are arranged so as to pass through a single-phase insulator.

The busbar openings 14, 16, 24, 26, 34 and 36 are each arranged on an end face of a respective separate, for example, specially associated, tube stump 12a, 12b, 22a, 22b, 32a and 32b respectively, and are connected via the tube stump to a main chamber of the common gas space. The tube stumps are spaced apart from one another, for example, they are not fused with one another.

The busbar openings 14, 24, 34 and 16, 26 and 36 are surrounded circumferentially by respective flanges 15, 25, 35 and 17, 27, 37. The flanges are spaced apart from a wall section of the main chamber by tube stumps 12a, 12b, 22a, 22b, 32a, 32b and are configured as independent flanges. Each of the busbar openings has a dedicated separate flange, for example, the flanges are spaced apart from one another. The flanges 15, 25, 35 are in a common plane, the first opening plane E1. Likewise, the flanges 17, 27, 37 lie in a common plane, the third opening plane E3. As can be seen from FIGS. 3a to 3c, each of the flanges is provided with screw holes for fastening screws, with the aid of which a barrier insulator or a post insulator can be fastened on the respective flange. Depending on requirements, the screw hole can be in the form of a through-hole or a threaded hole. These screw holes are not shown in the remaining drawings, for reasons of simplicity, but such screw holes are provided in all flanges 15, 25, 35, 17, 27, 37 and 57, 67, 77 (see below), even if they are not illustrated in some drawings. Barrier insulators, conductors passing through the barrier insulators and further such elements do not belong to the housing in the narrow sense and are not illustrated in FIGS. 1 to 4b. These elements are illustrated in FIG. 6 and are described further below in more detail with reference to FIG. 6.

Each of the flanges 15, 25, 35 is fitted on the end of a respective one of the tube stumps 12a, 22a and 32a and protrudes laterally from the respective tube stump. As a result, each of the flanges 15, 25, 35 is accessible from outside the housing, from a region behind the respectively associated opening 14, 24, 34. As a result, the fastening devices for the barrier insulators are accessible from outside the housing volume, and simple fitting, dismantling and maintenance of the housing 1 is made possible. The above also applies correspondingly to the second busbar openings 16, 26, 36 (fitted on the end of a respective tube stump 12b, 22b or 32b) and to the flanges 17, 27, 37 thereof.

In the text which follows, the arrangement and some properties of the outgoing conductor connection group with the outgoing conductor openings 56, 66, 76 and the outgoing conductor housing sections 50, 60, 70 are described. The outgoing conductor openings 56, 66, 76 serve to separately accommodate in each case one of three outgoing conductors, to be more precise outgoing nominal conductors of the switchgear assembly. The outgoing conductor openings 56, 66, 76 are arranged areally in a second opening plane E2 and along a second straight line 6. This second straight line 6 runs perpendicular to the straight lines 4 and 4'. The three outgoing conductor openings 56, 66, 76 are arranged on a respective one of the three outgoing conductor housing sections 50, 60, 70.

The outgoing conductor openings 56, 66, 76 are each directed towards the x direction, for example, towards the direction perpendicular to the straight lines 4 and 6. In other words, the normal of the outgoing conductor openings 56, 66, 76 extends in the x direction. Thus, the outgoing conductor openings 56, 66, 76 define an outgoing normal plane E4 (x-y plane), which contains the second straight line 6 and is perpendicular to the second opening plane E2. The outgoing normal plane E4 is therefore the plane E4 spanned by the second straight line 6 and the mutually parallel normals of the outgoing conductor openings 56, 66, 76. Outgoing nominal conductors, which leave the outgoing conductor openings 56, 66, 76 centrally and perpendicularly, therefore lie in the outgoing normal plane E4. The outgoing normal plane E4 can also be defined in another way, for example, as the plane which is perpendicular to the first straight line 4 and contains the second straight line 6. More generally, an outgoing normal plane is understood to be not only the plane E4, but any plane spanned by the mutually parallel normals of the outgoing conductor openings 56, 66, 76, for example, any plane which is parallel to the plane E4.

The outgoing normal plane E4 intersects the busbar normal plane defined further above in a line of intersection, which is offset with respect to each of the mid-axes of the busbar openings 14, 24, 34 or the cylindrical busbar housing sections 12, 22, 32 in the direction of the first straight line 4 (z direction). The line of intersection is arranged between two of the busbar openings 14, 24, 34 and therefore outside the busbar openings 14, 24, 34. The outgoing normal plane is arranged centrally between the busbar opening 14 and the busbar opening 24. The advantages of this arrangement are described further below with reference to FIG. 6.

Each of the three outgoing conductor openings 56, 66, 76 is surrounded circumferentially by a respective flange 57, 67, 77. The flanges are arranged at the end of a respective one of the tube stumps 53a, 63a and 73a and lie in a common plane, the second opening plane E2 (y-z plane). Apart from this difference and further differences shown in FIGS. 1 to 4b, the same applies to the outgoing conductor openings 56, 66, 76, the tube stumps 53a, 63a, 73a and the flanges 57, 67, 77 as was stated further above for the corresponding parts of the first busbar openings.

In alternative exemplary embodiments, the flanges of the first busbar openings and/or the second busbar openings and/or the outgoing conductor openings are completely or partially integrated in a common wall section of a main chamber of the housing, depending on the embodiment. Depending on the embodiment, at least two of the flanges of the first busbar openings and/or the second busbar openings and/or the outgoing conductor openings are connected to one another to form a flange group. For example, all of the flanges of the first busbar openings and/or the second busbar openings and/or the outgoing openings are connected to one another to form a respective first busbar flange group and/or second busbar flange group and/or outgoing flange group.

The outgoing conductor housing section 50 is in the form of a sausage and includes a cylindrical housing section 53 with a cylinder axis extending in the z direction. Furthermore, the outgoing conductor housing section 50 includes a rounded-off upper end piece 52, which is fitted as a terminating piece on an upper end side of the outgoing conductor housing section 50, and a tubular transition piece 54 on the end side opposite the terminating piece. At least sections of the outgoing conductor housing section 50 (namely the section of the housing section 53) have a cylindrical internal volume. The outgoing conductor housing section 50 is therefore fused with the busbar housing sections 10, 20, 30 in such a way that it connects the internal volumes thereof to one another, as can be seen in more detail in FIG. 3a. The outgoing conductor housing section 70 has a corresponding configuration to the outgoing conductor housing section 50.

The centrally arranged outgoing conductor housing section 60 is likewise largely configured corresponding to the outgoing conductor housing section 50, but has the following differences: instead of a transition piece, the outgoing conductor housing section 60 also has a rounded-off lower end 65. The outgoing conductor housing section 50 is therefore fused with the busbar housing sections 10, 20 in such a way that it connects the internal volumes thereof directly to one another, as can be seen in more detail in FIG. 3*b*. On the other hand, the outgoing conductor housing section 60 is spaced apart (separated by the aperture 8) from the busbar housing section 30 and therefore does not have a direct connection with the busbar housing section. Overall, the outgoing conductor housing sections 50, 70 therefore connect the internal volumes of the three busbar housing sections 10, 20, 30 directly to one another, and the outgoing conductor housing section 60 connects the internal volumes of two of the busbar housing sections 10 and 20 directly to one another.

In alternative exemplary embodiments, the outgoing conductor housing sections 50, 60, 70 can also have different lengths and arrangements in the z direction, with the result that they connect different combinations of the busbar housing sections directly to one another. For example, in such an alternative embodiment, the outgoing conductor housing section 70 is shortened at its lower end in such a way that it is fluidically connected directly only to the uppermost busbar housing section 10. The remaining outgoing conductor housing sections 50, 60 are as illustrated in FIGS. 1 to 4*b*, for example, the outgoing conductor housing section 50 is fluidically connected directly to all three busbar housing sections 10, 20, 30 and the outgoing conductor housing section 60 is fluidically connected directly only to two of the three busbar housing sections, namely to the busbar housing sections 10 and 20.

In accordance with a further alternative, the outgoing conductor housing section 50 is fluidically connected directly only to the busbar housing section 10, the outgoing conductor housing section 60 is fluidically connected directly to the three busbar housing sections 10, 20, 30, and the outgoing conductor housing section 70 is fluidically connected directly only to the busbar housing sections 10 and 20.

The outgoing conductor housing sections 50, 60, 70 are spaced apart from one another. The distance between their cylinder axes is greater than the diameter or double the radius of curvature of their cylindrical wall sections. To be more precise, the cylinder axes of the outgoing conductor housing sections 50, 60, 70 are arranged so as to be removed from one another at a uniform distance in the direction of the second straight line 6. The distance is equal to the distance by which the cylinder axes of the busbar housing sections 10, 20, 30 are spaced apart from one another. For this reason, the distance is also referred to as unit distance.

The text which follows describes the arrangement and some properties of the actuating shaft housing section 40: the actuating shaft housing section 40 is suitable or intended for accommodating an actuating shaft for actuating switching elements which can be arranged in the gas space. The actuating shaft housing section 40 is cylindrical, with a cylinder axis 144 extending parallel to the busbar housing sections 10, 20, 30 (for example, in the y direction). The cylinder axis is arranged in the second plane E2. The actuating shaft housing section 40 extends along the three outgoing conductor housing sections 50, 60, 70 and transversely with respect thereto. The actuating shaft housing section 40 provides an internal volume for accommodating an actuating shaft extending along the cylinder axis 144. The internal volume of the actuating shaft housing section 40 is connected directly to the respective interior of the outgoing conductor housing sections 50, 60, 70. The actuating shaft housing section is arranged so as to be offset in the x direction with respect to the cylinder axes of the busbar housing sections 11, 21, 31. The offset amounts to half the distance between the cylinder axes of the busbar housing sections 11, 21, 31 (in each case the distance from center to center), for example, the unit distance.

As regards the orthogonal reference system (coordinate system), the z direction is defined by the direction of the first straight line 4. The y direction, which is perpendicular to the z direction, is then defined by the second straight line 6. Thus, the x direction is also defined as the direction perpendicular to the z and y directions.

Figure 4A:
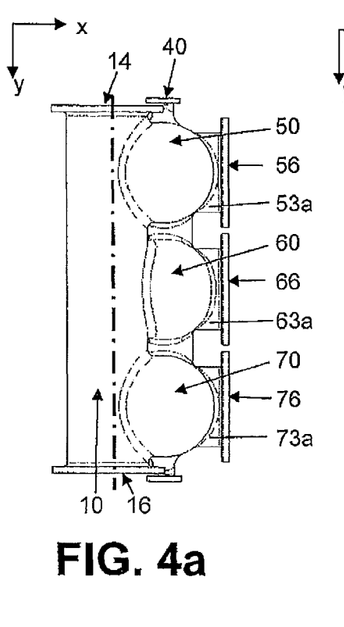
FIG. 4a shows a view of the switchgear assembly module housing from above according to an exemplary embodiment of the present disclosure.
Figures 4B, 5:
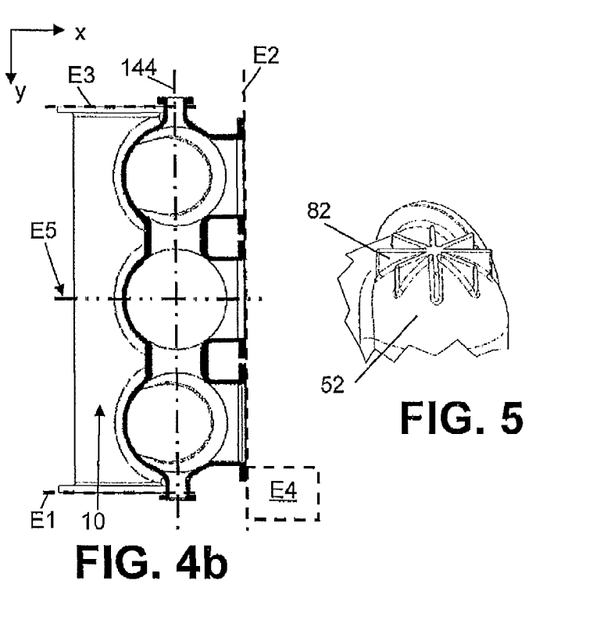
FIG. 4b shows a horizontal cross-sectional view of the switchgear assembly module housing according to an exemplary embodiment of the present disclosure.
FIG. 5 shows part of a switchgear assembly module housing in accordance with an exemplary embodiment of the disclosure.

The second straight line 6, along which the outgoing conductor openings 56, 66, 76 are arranged, is offset with respect to the first straight line 4 in the x direction, with the result that the first straight line 4 and the second straight line 6 do not intersect one another. The third straight line 4' runs parallel to the z direction. The first opening plane E1 extends parallel to the x and z directions (x-z plane). The second opening plane E2 extends parallel to the y and z directions (y-z plane). The second opening plane E2 is therefore arranged perpendicular to the first opening plane E1. The second straight line 6 runs perpendicular to the first opening plane E1. The first straight line 4 runs parallel to the second opening plane E2. The planes E1 to E4 are illustrated in FIG. 4*b* by dashed lines. In this case, the planes E1 to E3 run perpendicular to the plane of the drawing in FIG. 4*b* (in the z direction) and are therefore only visible as the dashed line. The plane E4 runs in the plane of the drawing in FIG. 4*b*. In addition, the actuation axis 144 is also illustrated as a dashed line in FIG. 4*b*.

In order for it to be possible for the housing 1 to be used as a module in the context of a modular switchgear assembly concept, the housing 1 is dimensioned with respect to a unit distance of the module. This unit distance is defined by the uniform distance at which the respective centers of the three first busbar openings 14, 24, 34 are arranged in relation to one another in a row along the first straight line 4. The respective centers of the three outgoing conductor openings 56, 66, 76 are likewise arranged in a row at the unit distance from one another along the second straight line 6. The respective centers of the three second busbar openings 16, 26, 36 are likewise arranged in a row at the unit distance from one another along a third straight line 4'.

The text which follows describes further general properties of the housing. The internal volume of the housing forms a continuous gas space. The busbar openings 14, 24, 34 and 16, 26, 36 and the outgoing conductor openings 56, 66, 76 each form a separate access point to the gas space from outside the housing. The gas space is therefore connected to the three first and second busbar openings and to the three outgoing conductor openings. The common gas space serves, inter alia, to accommodate an insulating gas and three gas-insulated busbar conductor sections. The busbar openings 14, 24, 34 and 16, 26, 36 and the outgoing conductor openings 56, 66, 76 are configured such that they make it possible to accommodate single-phase insulators (for example, insulators for accommodating only a single phase conductor). Thus, the housing 1 forms a continuous gas space 3 for the three-phase encapsulation of the busbar nominal conductors and has busbar openings 14, 24, 34 and 16, 26, 36 for busbar connections, which are guided away in single-phase fashion from the housing interior (connectors passed out in single-phase fashion from the housing interior). The same applies to the outgoing openings 56, 66, 76.

The housing is formed in substantially one piece, for example, is manufactured from one piece, apart from parts which are not essential to the housing shape (inspection windows, access points, barrier insulators etc.). Therefore, the housing can be fitted as a whole. The housing 1 is a casting, for example, a part cast in a mold (and therefore having a cast-moldable configuration). The housing 1 is cast from aluminum or another metal and/or alloys thereof. Be that as it may, welded variants of the housing 1 are conceivable. The housing 1 is configured such that it can withstand an internal pressure of at least 2 bar. In addition, the housing 1 is designed such that it would be capable of carrying its own mass if it were supported on at least two of the flanges, for example, on three of the flanges, such as if it were supported on the flanges of the outgoing conductor openings 56, 66, 76. This condition places certain requirements on the torsion resistance of the wall material and the thickness of the flange connections, but does provide advantages including ease of fitting and fastening in a switchpanel.

The housing 1 is designed such that it provides a common gas space (gas volume) for conductor sections arranged along a straight line (busbar conductor sections arranged along the straight lines 4 and 4' and outgoing conductor sections arranged along the straight line 6). The arrangement along a line enables effective mutual shielding and insulation even for high voltages as well as the possibility of using tried and tested concepts and layouts of single-phase-encapsulated switchgear assembly systems. Furthermore, the common gas volume has the advantage that the introduction of gas and the checking of the gas pressure are simplified.

Furthermore, the housing 1 is designed such that the outer surface of the housing 1 is at least partially designed to be constricted, for example, has concave depressions. These depressions are provided, for example, in the transition region between the first busbar openings 14, 24, 34 and the outgoing conductor openings 56, 66, 76, between the second busbar openings 16, 26, 36 and the outgoing conductor openings 56, 66, 76 and/or between the first busbar openings 14, 24, 34 and the second busbar openings 16, 26, 36. The outer surface is in this case to be understood as meaning the total outer surface without taking into account the local elements which are irrelevant in this case, such as screws, grips etc.

The concave depressions result in a reduction in the gas volume and/or an increase in the surface area of the housing 1. In general and irrespective of the embodiment illustrated, the gas volume is reduced in comparison with an imaginary enveloping square 9 by at least 20%, at least 30% or even at least 50%. In this case, the imaginary square is defined as the smallest square which completely surrounds the gas volume of the housing 1. FIG. 2b illustrates the corresponding imaginary square by virtue of the dotted square 9.

In addition, the housing has some apertures, which pass through the housing. The aperture 8, which extends in the region between the busbar housing sections 20 and 30 and between the two outer outgoing conductor housing sections 50 and 70, can be seen particularly well in FIG. 1b. The aperture 8 passes through the outer envelope and therefore also the interior volume of the housing 1. In this case, the aperture 8 should not be understood as being an opening in the housing wall which would allow access to the gas space. The aperture does not produce a connection between the gas space and the exterior of the housing. Instead, an aperture is understood to mean a topological hole which means that although the gas space forms a continuous volume, it does not form a singly continuous volume. The volume can also be described as a volume with a ring-like cross section running in the y-z plane (where "ring-like" should not exclude the possibility of yet further apertures being provided in addition to the aperture forming the interior of the ring).

Further such apertures extend in the region between the busbar housing sections 10 and 20 and firstly between the outgoing conductor housing sections 50 and 60 and secondly between the outgoing conductor housing sections 60 and 70.

The constricted housing shape and also the apertures have the advantage that the gas space 3 can be kept as small as possible, with the result that as small an insulating gas volume as possible needs to be provided. Since many insulating gases such as SF6 have unfavorable environmental properties and are also expensive, this has the advantage that the required quantity of insulated gas is reduced. In addition, the apertures have the advantage that they increase the ratio of the housing surface area to the interior volume thereof. As a result, the dissipation of heat from the housing is also increased. In addition, the apertures provide a transport handle for the housing and thus make it possible for the housing to be handled more easily.

A further advantageous embodiment of the housing 1 illustrated in FIGS. 1 to 4b includes the symmetry properties of the housing. The symmetries described below of the housing provide advantages in terms of its versatility in use in the context of a modular system. First, the openings, for example, the first busbar openings 14, 24, 34, the second busbar openings 16, 26, 36 and the outgoing openings 56, 66, 76, already have symmetrical properties: the set of these openings are arranged in mirror-symmetrical fashion with respect to a mirror plane E5, which in this embodiment corresponds to the plane identified by IIIb in FIG. 2a. This mirror plane IIIb is arranged parallel to the first opening plane E1. The mirror plane IIIb further runs through the central outgoing conductor opening 66. Not only the openings, but the entire housing is constructed to be substantially mirror-symmetrical with respect to the mirror plane IIIb. Substantially mirror-symmetrical in this case means, in addition to the above-described symmetry with respect to the busbar and outgoing openings, also a symmetry with respect to the main geometry of the housing (but not with respect to any auxiliary connections and other nonessential details). In terms of quantity, "substantially mirror-symmetrical" means that the volume of the gas space 3 which is not overlapping when mirrored should not be more than 5% of the total volume of the gas space 3.

Figure 2A:
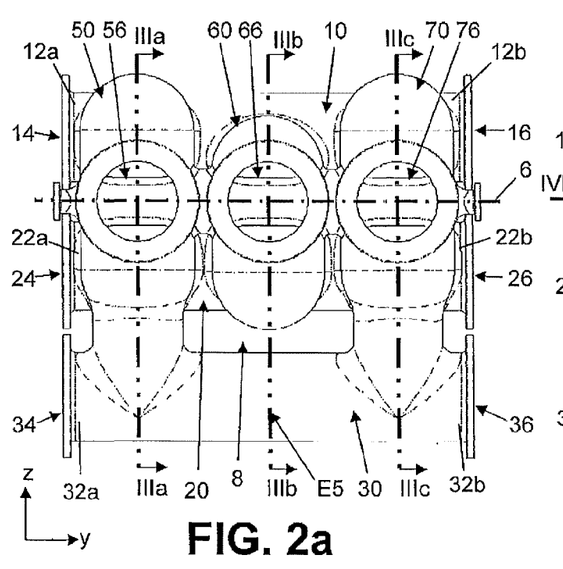
FIGS. 2a and 2b show further front and side views, respectively, of the switchgear assembly module housing according to an exemplary embodiment of the present disclosure.
Figure 2B:
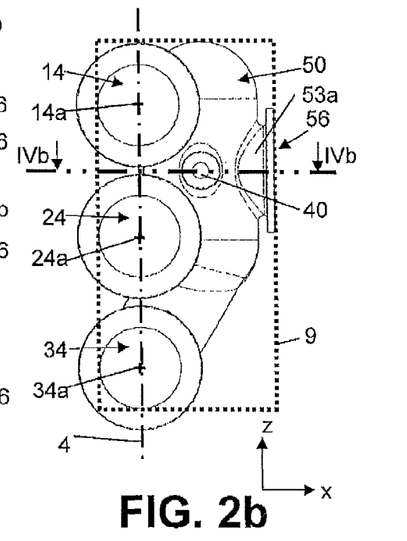
Figure 3A:
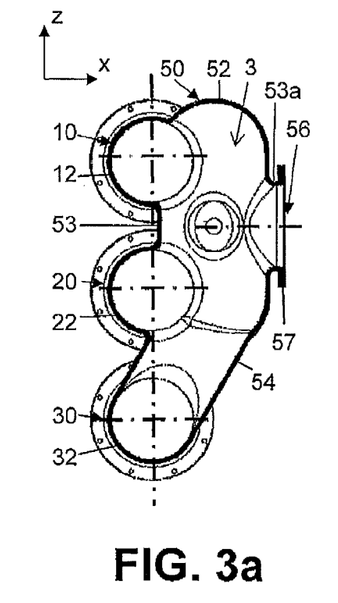
FIGS. 3a to 3c show lateral cross sections through the switchgear assembly module housing according to an exemplary embodiment of the present disclosure.
Figure 3B:
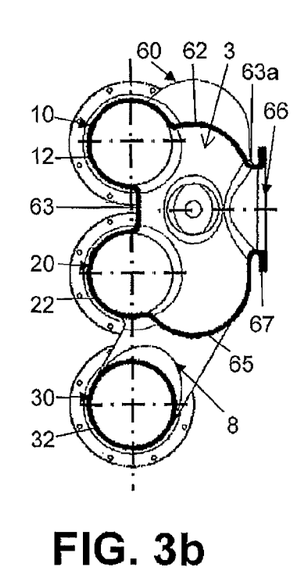
Figure 3C:
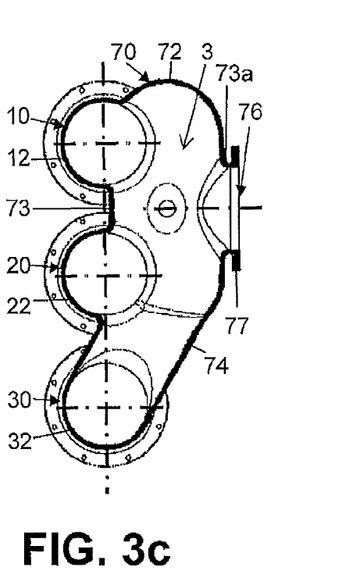

Furthermore, it can clearly be seen from FIG. 2a how the outgoing conductor housing sections 50, 70 each connect the internal volumes of the busbar housing sections 10, 20, 30 to one another. The outgoing conductor housing section 60, on the other hand, only connects the internal volumes of the busbar housing sections 10 and 20 to one another, but does not produce a connection with the internal volume of the busbar housing section 30. The outgoing conductor housing section 60 is separated from the busbar housing section 30 by the aperture 8. This can likewise be seen in FIGS. 3a to 3c, which illustrate lateral cross sections through the switchgear assembly module housing 1, in each case along the cross-sectional planes IIIa, IIIb and IIIc extending in the x-z direction (see FIG. 2a): it can likewise be seen from FIGS. 3a and 3c how the outgoing conductor housing sections 50, 70 each connect the internal volumes of the busbar housing sections 10, 20, 30 to one another. It can be seen from FIG. 3b how the outgoing conductor housing section 60 only connects the internal volumes of the busbar housing sections 10 and 20 to one another, but is separated from the busbar housing section 30 by the aperture 8.

The housing illustrated in FIGS. 1a to 4b can be made more universal in various ways. It is thus also possible, for example, for the second busbar openings not to be designed to be mirror images of the first busbar openings, but to be arranged differently with respect to the first busbar openings. In general, the second busbar openings can also be opposite the first busbar openings, for example at an angle. It is also possible for the second straight line 6 to be inclined with respect to the first straight line 4 in a different way than at a right angle, for example it can have an angle of 45°.

FIG. 5 shows part of the switchgear assembly module housing in accordance with a further embodiment of the disclosure. In this case, the upper end 52 of the conductor outgoing housing section 50 (see FIG. 1*a*) is varied in comparison with FIGS. 1*a* to 4*b*. In FIG. 5, a cooling device for increasing (in comparison with a normal, smooth surface) the heat dissipation from the internal volume of the housing over the housing surface is fitted at the end 52. In FIG. 5, the cooling device includes cooling ribs 82 running in the form of a star. The upper end pieces of the remaining conductor outgoing housing sections are varied in a similar manner and provided with a corresponding cooling device. In alternative exemplary embodiments, the cooling device instead includes cooling ribs running parallel to one another or cooling ribs 86 running in the form of concentric circles. As a further variation, it is also possible for an active cooling device (with energy supplied for the cooling, for example a fan) to be used instead of the passive cooling devices illustrated in FIG. 5. It is also possible for a thermosiphon to be used. A cooling device is in this case understood to mean that it has an active or passive structure with systematically improved cooling in comparison with a smooth surface.

Such a cooling device has the advantage that heat can be dissipated more efficiently from the housing interior. The arrangement on a terminating piece of the outgoing conductor housing section, for example, in this case on the upper end pieces 52, 62, 72 of the conductor outgoing housing sections 50, 60, 70 (see FIG. 1*a*), has the advantage that, owing to the position right at the top in the housing, the heat has the particular tendency there to accumulate and therefore can be dissipated particularly effectively from there.

The switchgear assembly module housing 1 furthermore has various openings, access points and inspection windows which can be closed in a gas-tight manner. The inspection windows and access points are closed in a gas-tight manner, but can be partially opened in order to enable monitoring and maintenance of the housing interior. The access points can also be connected to a gas line for introducing gas into the housing interior and for monitoring the gas pressure. The inspection windows can be equipped with rupture disks.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

| | |
|---|---|
| 1 | Housing for switchgear assembly module |
| 3 | Gas space/chamber |
| 4 | First straight line (straight line in z direction for first busbar openings) |
| 4' | Third straight line (straight line in z direction for second busbar openings) |
| 6 | Second straight line (straight line in y direction for conductor outgoing openings) |
| 8 | Hole/aperture |
| 9 | Enveloping square |
| 10 | Upper busbar housing section |
| 12 | Cylindrical housing section |
| 12a, 12b | Tube stumps |
| 14 | Upper busbar opening |
| 14a | Normal |
| 15 | Flange |
| 16 | Upper busbar opening |
| 17 | Flange |
| 20 | Central busbar housing section |
| 22 | Cylindrical housing section |
| 22a, 22b | Tube stumps |
| 24 | Central busbar opening |
| 24a | Normal |
| 25 | Flange |
| 26 | Central busbar opening |
| 27 | Flange |
| 30 | Lower busbar housing section |
| 32 | Cylindrical housing section |
| 32a, 32b | Tube stumps |
| 34 | Lower busbar opening |
| 34a | Normal |
| 35 | Flange |
| 36 | Lower busbar opening |
| 37 | Flange |
| 40 | Actuating shaft housing section |
| 42 | Actuating shaft opening |
| 50 | Lateral conductor outgoing housing section |
| 52 | Upper end piece of conductor outgoing housing section |
| 53 | Cylindrical housing section |
| 53a | Tube stump |
| 54 | Lower transition piece |
| 56 | Lateral conductor outgoing opening |
| 57 | Flange |
| 60 | Central conductor outgoing housing section |
| 62 | Upper end piece of conductor outgoing housing section |
| 63 | Cylindrical housing section |
| 63a | Tube stump |
| 65 | Lower end piece of conductor outgoing housing section |
| 66 | Central conductor outgoing opening |
| 67 | Flange |
| 70 | Lateral conductor outgoing housing section |
| 72 | Upper end piece of conductor outgoing housing section |
| 73 | Cylindrical housing section |
| 73a | Tube stump |
| 74 | Lower transition piece |
| 76 | Lateral conductor outgoing opening |
| 77 | Flange |
| 82 | Cooling ribs |
| 114 | Actuation axis |
| E1 | First opening plane |
| E2 | Second opening plane |
| E3 | Third opening plane |
| E4 | Outgoing normal plane |

What is claimed is:

1. A housing for a switchgear assembly module of a switchgear assembly, wherein the housing forms a common gas space suitable for accommodating an insulating gas and three gas-insulated busbar nominal conductors of the switchgear assembly module, the housing comprising:

three first busbar openings, wherein the three first busbar openings are arranged areally in a first opening plane and along a first straight line;

three second busbar openings, wherein the three second busbar openings are arranged on a side of the housing which is opposite the three first busbar openings; and three outgoing conductor openings, wherein the three outgoing conductor openings are arranged areally in a second opening plane, wherein center points of the three outgoing conductor openings are arranged along a second straight line, and wherein an outgoing normal plane, which is perpendicular to the second opening plane and contains the second straight line, is arranged between an outer one of the first busbar openings and a central one of the first busbar openings.

2. The housing as claimed in claim 1, wherein the second straight line runs at an incline with respect to the first straight line.

3. The housing as claimed in claim 1, wherein the first straight line, the second straight line, the first opening plane or the second opening plane run in accordance with at least one of the following arrangements (a) to (d):
 (a) the second opening plane is arranged transversely to the first opening plane;
 (b): the second straight line is offset with respect to the first straight line in such a way that the first straight line and the second straight line do not intersect one another and the second opening plane extends parallel to a plane which emerges from the first plane through a 90 degree rotation about the first straight line;
 (c): the second straight line runs inclined to the first opening plane; and
 (d) the first straight line runs parallel to the second opening plane.

4. The housing as claimed in claim 1, wherein an internal volume of the housing forms a continuous gas space, and
 wherein the three first busbar openings, the three second busbar openings, and the three outgoing conductor openings each form a separate access for each nominal conductor to the gas space from outside the housing.

5. The housing as claimed in claim 1, wherein the three second busbar openings are arranged areally in a third opening plane and along a third straight line, and
 wherein the third opening plane is parallel to the first opening plane and the third straight line is parallel to the first straight line.

6. The housing as claimed in claim 1, wherein each of the three second busbar openings is arranged with respect to an associated one of the three first busbar openings and forms therewith a respective busbar opening pair for accommodating a respective continuous straight busbar conductor section therebetween.

7. The housing as claimed in claim 1, wherein at least one of:
 respective centers of the three first busbar openings are arranged in a row at a uniform unit distance from one another along the first straight line;
 respective centers of the three outgoing conductor openings are arranged in a row at the uniform unit distance from one another along the second straight line; and
 respective centers of the three second busbar openings are arranged in a row at the uniform unit distance from one another along a third straight line.

8. The housing as claimed in claim 1, wherein the outgoing normal plane is arranged centrally between the outer one of the first busbar openings and the central one of the first busbar openings.

9. The housing as claimed in claim 1, wherein the housing is at least one of integral and in the form of a casting.

10. The housing as claimed in claim 1, wherein the housing is configured to withstand an internal pressure of at least 2 bar.

11. The housing as claimed in claim 1, wherein at least one of the first busbar openings, the second busbar openings and the outgoing openings are connected to a main chamber of the common gas space via a respective tube stump.

12. The housing as claimed in claim 1, wherein at least one of the first busbar openings, the second busbar openings, and the outgoing openings have in each case one flange, which surrounds the respective openings circumferentially, on the connection side.

13. The housing as claimed in claim 12, wherein the housing and the flanges are configured such that the housing is capable of supporting its own mass when the housing is supported on at least two of the flanges.

14. The housing as claimed in claim 1, comprising:
 three outgoing conductor housing sections, wherein the three outgoing conductor openings are arranged on a respective one of the three outgoing conductor housing sections; and
 three busbar housing sections, which extend between a respective one of the first busbar openings and a respective one of the second busbar openings,
 wherein at least one of the three outgoing conductor housing sections connects the internal volumes of in each case at least two of the three busbar housing sections of the gas space to one another.

15. The housing as claimed in claim 14, wherein a first outgoing conductor housing section of the three outgoing conductor housing sections connects the three busbar housing sections directly to one another, and
 wherein a second outgoing conductor housing section of the three outgoing conductor housing sections connects only two of the three busbar housing sections directly to one another.

16. The housing as claimed in claim 1, wherein the outgoing conductor openings are each directed towards a direction which is perpendicular to the first straight line and the second straight line.

17. The housing as claimed in claim 1, wherein the housing has at least one aperture, which passes through the common gas space.

18. The housing as claimed in claim 1, comprising:
 a cooling device configured to increase heat dissipation from the gas space of the housing.

19. The housing as claimed in claim 1, wherein a set of openings comprising the first busbar openings, the second busbar openings and the outgoing openings are arranged in mirror-symmetrical fashion with respect to a mirror plane, and
 wherein the mirror plane is arranged parallel to the first opening plane.

20. A switch panel, containing a housing as claimed in claim 1.

21. The housing as claimed in claim 1, wherein the second straight line runs perpendicular to the first straight line.

22. The housing as claimed in claim 3, wherein in arrangement (a), the second opening plane is arranged perpendicular to the first opening plane, and
 wherein in arrangement (c), the second straight line runs perpendicular to the first opening plane.

23. The housing as claimed in claim 2, wherein the first straight line, the second straight line, the first opening plane or the second opening plane run in accordance with at least one of the following arrangements (a) to (d):
 (a) the second opening plane is arranged transversely to the first opening plane;
 (b): the second straight line is offset with respect to the first straight line in such a way that the first straight line and the second straight line do not intersect one another and the second opening plane extends parallel to a plane which emerges from the first plane through a 90 degree rotation about the first straight line;
 (c): the second straight line runs inclined to the first opening plane; and (d) the first straight line runs parallel to the second opening plane.

24. The housing as claimed in claim 23, wherein in arrangement (a), the second opening plane is arranged perpendicular to the first opening plane, and wherein in arrangement (c), the second straight line runs perpendicular to the first opening plane.

25. The housing as claimed in claim 13, wherein the housing and the flanges are configured such that the housing is capable of supporting its own mass when the housing is supported on three of the flanges.

26. The housing as claimed in claim 13, wherein the housing and the flanges are configured such that the housing is capable of supporting its own mass when the housing is supported on the flanges of the outgoing conductor openings.

* * * * *